(12) United States Patent
Fisher (10) Patent No.: US 9,352,639 B2
(45) Date of Patent: May 31, 2016

(54) SERVICE VEHICLE DOOR SYSTEM (71) Applicant: Halcore Group, Inc., Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 10 days.

(21) Appl. No.: 14/516,834

(22) Filed: Oct. 17, 2014

(65) Prior Publication Data

US 2015/0108786 A1 Apr. 23, 2015

Related U.S. Application Data (60) Provisional application No. 61/894,170, filed on Oct. 22, 2013.

(51) Int. Cl.
*B60J 5/00* (2006.01)
*B60J 5/04* (2006.01)
(52) U.S. Cl.
CPC .............. *B60J 5/0491* (2013.01); *B60J 5/0488* (2013.01); *B60J 5/0497* (2013.01)
(58) Field of Classification Search
CPC ..................... E05Y 2900/50; E05Y 2900/518; B60J 5/0491; B60J 5/0488; B60J 5/0497
See application file for complete search history.

(56) References Cited

U.S. PATENT DOCUMENTS

| | | | |
|---|---|---|---|
| 4,216,725 A | 8/1980 | Hallam | |
| 4,274,190 A | 6/1981 | Slattery | |
| 4,615,275 A | 10/1986 | Ishizuka | |
| 5,312,150 A | 5/1994 | Quam | |
| 5,335,411 A | 8/1994 | Muller et al. | |
| 5,528,812 A | 6/1996 | Muller | |
| 5,669,307 A | 9/1997 | Cichy | |
| 6,749,251 B1 | 6/2004 | Papsdorf | |
| 7,036,870 B2 | 5/2006 | Nieminski et al. | |
| 7,681,298 B2 | 3/2010 | Babej | |
| 8,210,315 B2 | 7/2012 | Diehl et al. | |
| 2006/0021784 A1* | 2/2006 | Garmong | H05K 9/0001 174/100 |
| 2014/0102018 A1* | 4/2014 | Rochman | E06B 1/32 52/210 |

* cited by examiner

*Primary Examiner* — Lori L Lyjak
(74) *Attorney, Agent, or Firm* — Hovey Williams LLP (57) ABSTRACT

A door system for a service vehicle. The door system comprises a door frame that includes a plurality of elongated frame members, an interior panel coupled to the door frame, and a plurality of connectors for coupling the interior panel to the door frame. Additionally, each of the frame members comprises an attachment flange having a longitudinal groove and a series of longitudinally spaced insert openings. The insert openings extend entirely through the attachment flange and open into the longitudinal groove. As such, the connectors extend through the insert openings to secure the interior panel to the door frame.

20 Claims, 7 Drawing Sheets

SERVICE VEHICLE DOOR SYSTEM

RELATED APPLICATIONS

This non-provisional application claims priority to U.S. Provisional Patent Application Ser. No. 61/894,170 filed Oct. 22, 2013, and entitled "SERVICE VEHICLE DOOR CONFIGURATION," with the entirety of such provisional patent application incorporated by reference into this non-provisional application.

FIELD OF THE INVENTION

Embodiments of the present invention relate generally to door systems for vehicles. In more detail, embodiments of the present invention are directed to door systems for accessing storage compartments on service vehicles.

BACKGROUND

Service vehicles, such as ambulances and fire-trucks, are required to be generally self-sufficient. Specifically, service vehicles must be configured to house and transport various types of tools and equipment, such that service personnel are appropriately equipped to meet the needs of nearly any type of service and/or emergency situation that may arise. To accomplish such, most service vehicles come equipped with exteriorly accessible storage compartments for housing a variety of tools and equipment. Nevertheless, door systems associated with such storage compartments are often lacking in structural integrity, do not provide satisfactory sealing conditions, and are difficult and time-consuming to construct. Accordingly, there is a need for a door system for a service vehicle having improved structural integrity, improved sealing ability, and improved construction efficiency.

SUMMARY OF THE INVENTION

In one embodiment of the present invention, there is provided a door system for a service vehicle. The door system comprises a door frame including a plurality of elongated frame members, an interior panel coupled to the door frame, and a plurality of connectors for coupling the interior panel to the door frame. Each of the frame members comprises an attachment flange having a longitudinal groove and a series of longitudinally spaced insert openings. The insert openings extend entirely through the attachment flange and open into the longitudinal groove. As such, the connectors extend through the insert openings to secure the interior panel to the door frame.

In another embodiment of the present invention, there is provided a vehicle with a door system for accessing a compartment within the vehicle. The vehicle comprises a cab, a body located behind the cab, and the door system incorporated in the body of the vehicle. The door system comprises a door frame including a plurality of elongated frame members, an interior panel coupled to the door frame, and a plurality of connectors for coupling the interior panel to the door frame. Each of the frame members comprises an attachment flange having a longitudinal groove and a series of longitudinally spaced insert openings. The insert openings extend entirely through the attachment flange and open into the longitudinal groove. As such, the connectors extend through the insert openings to secure the interior panel to the door frame.

In yet another embodiment of the present invention, there is provided a process for forming a door system for a service vehicle. The process includes the initial step of providing a door frame comprised of a plurality of elongated frame members, with each frame member having an attachment flange that includes a longitudinal groove and a series of longitudinally spaced apart insert openings, and with the insert openings extending entirely through the attachment flange and opening into the longitudinal groove. The method next includes the step of inserting a plurality of inserts into the insert openings, with the inserts comprising an insert head, an internally threaded sleeve, and a deformable portion. A next step includes positioning an interior panel flushly against the attachment flanges of the frame members. A final step includes securing the interior panel to the door frame by inserting fasteners through the interior panel and into the inserts, with the fasteners each including a fastener head and an exteriorly threaded shaft. During the securing step, the inserts are deformed so as to compress the interior panel between the attachment flanges and the heads of the fasteners.

BRIEF DESCRIPTION OF THE FIGURES

Embodiments of the present invention are described herein with reference to the following drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
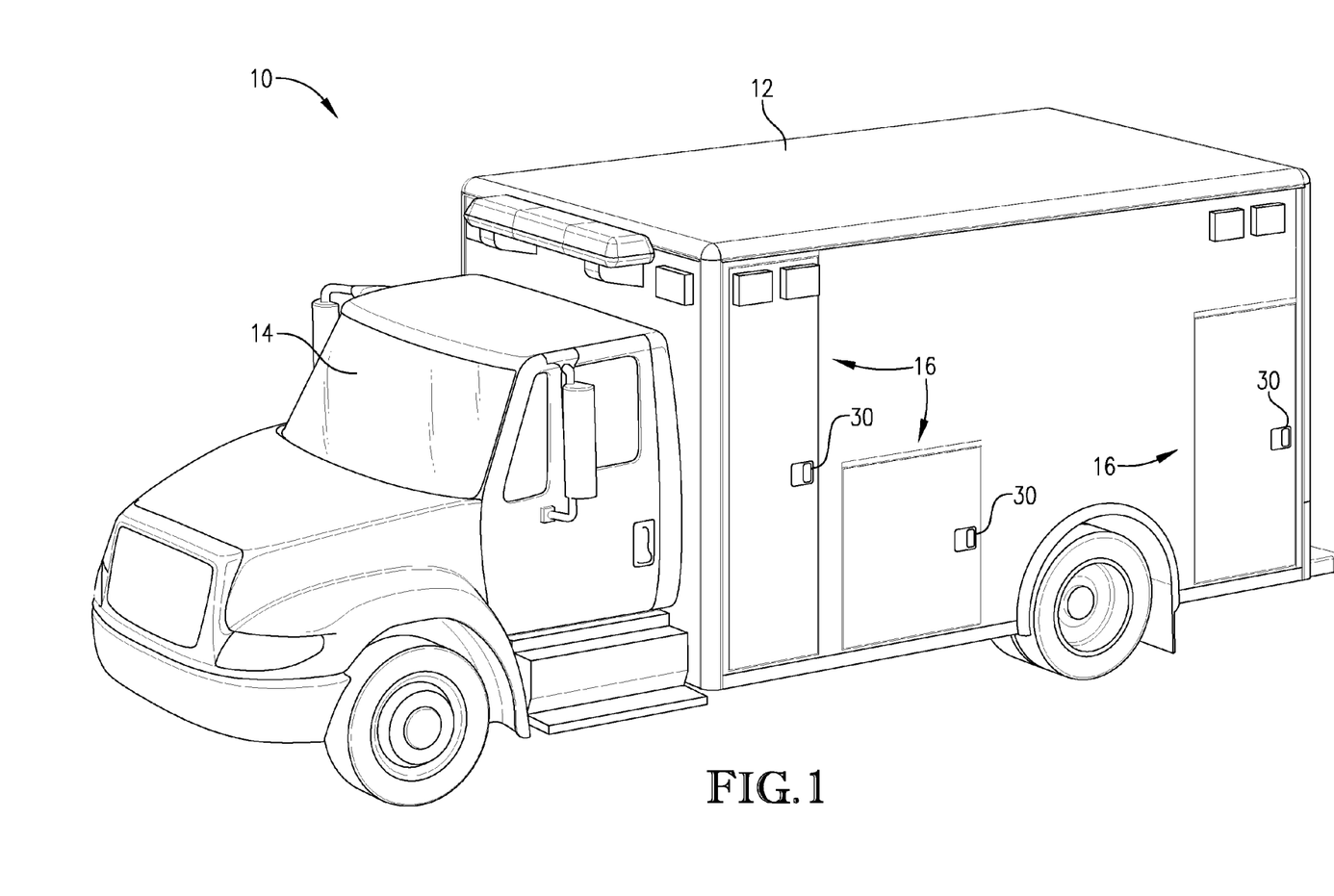
FIG. 1 is a perspective view of a service vehicle in accordance with one embodiment of the present invention, particularly showing a plurality of door systems incorporated within a body of the vehicle.
Figure 2:
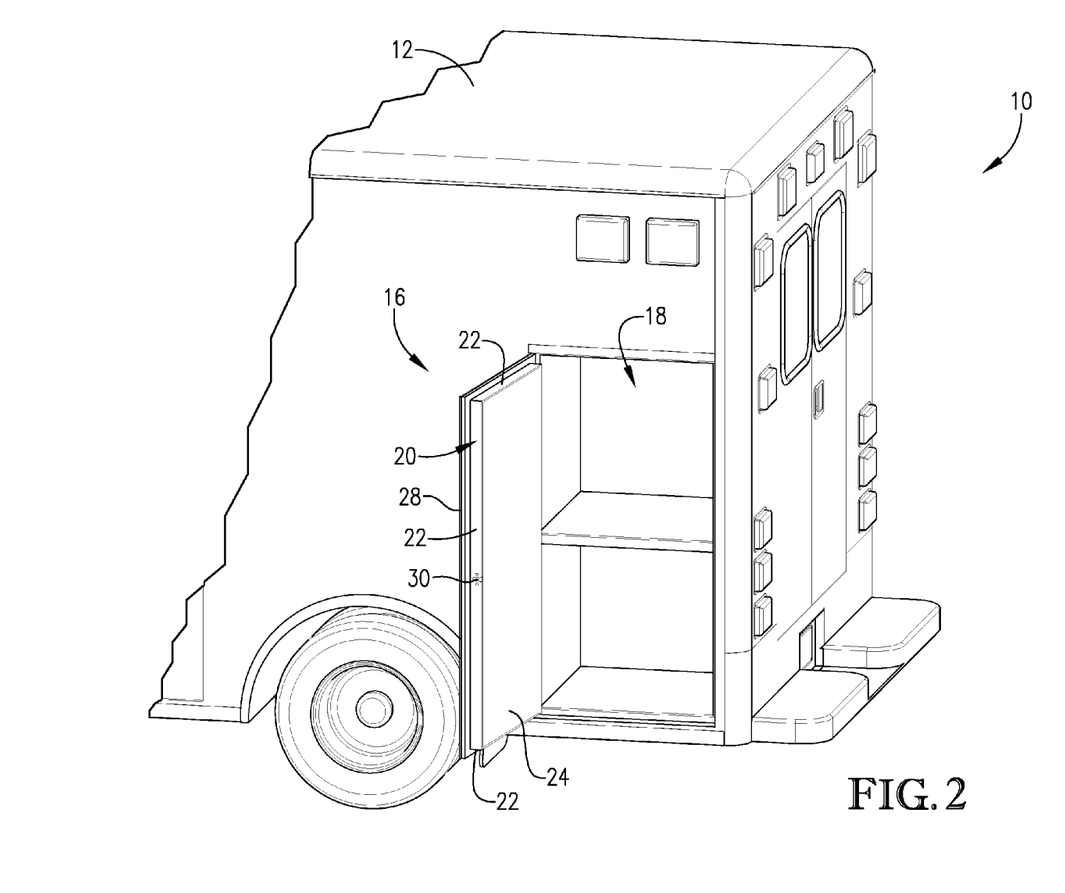
FIG. 2 is a partial perspective view of a rear portion of the body of the service vehicle of FIG. 1, particularly showing one of the door systems in an open position.

FIGS. 1-2 depict a vehicle 10 in accordance with one embodiment of the present invention. The vehicle 10 can include a vehicle body 12 and a cab/driver compartment 14. In certain embodiments, the body 12 may include one or more door systems 16 hingedly connected to the body 12 for accessing exteriorly-accessible storage compartments 18 (See FIG. 2). The vehicle 10 may be any type of vehicle such as, for example, an emergency vehicle (e.g., ambulance or fire-truck), a bus, a truck, or a recreational vehicle. In preferred embodiments, the vehicle 10 will be an emergency vehicle. In such embodiments, the body 12 will include an interior patient compartment, in addition to the door systems 16 and the corresponding exterior storage compartments 18.

Figure 3:
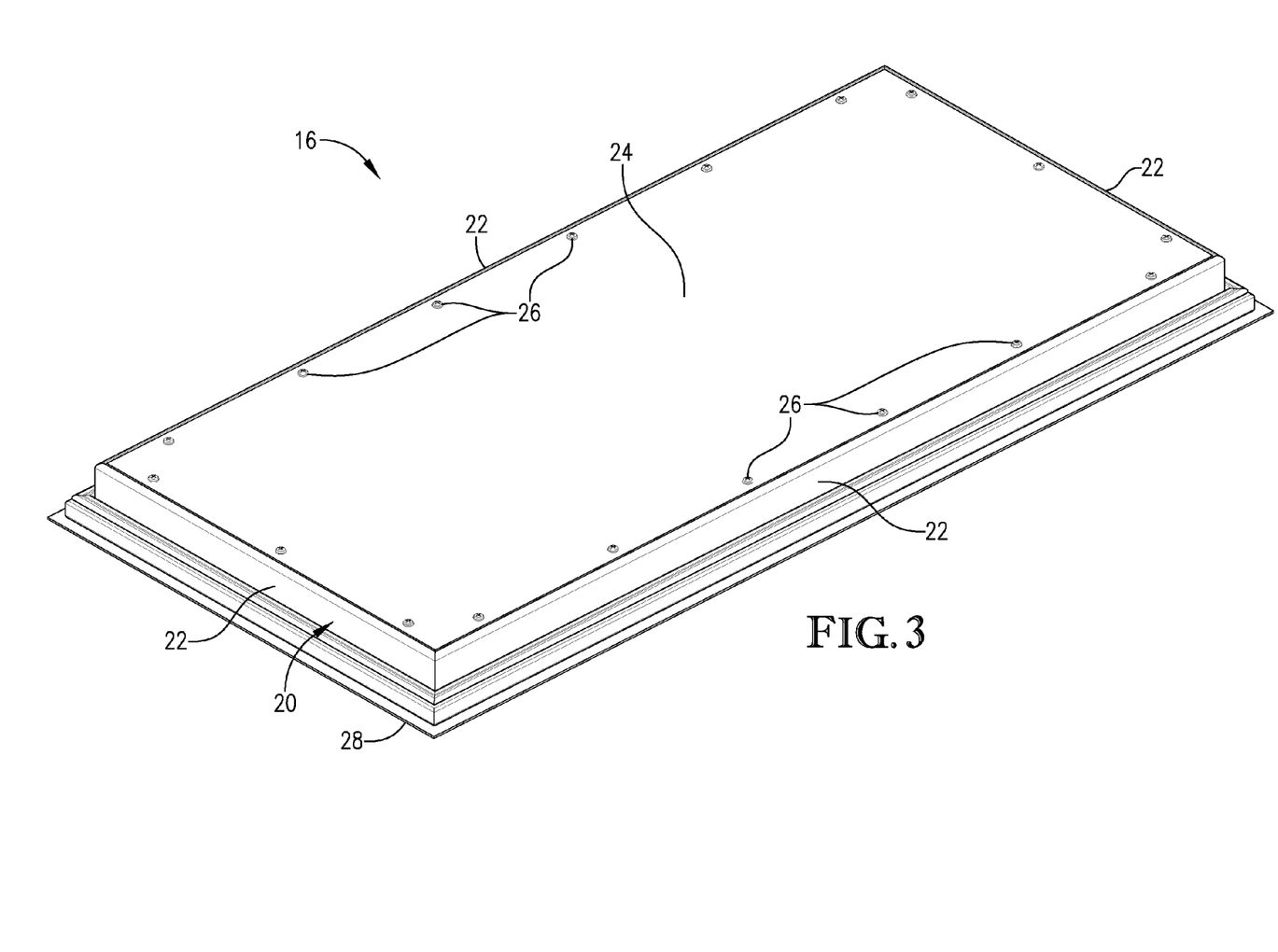
FIG. 3 is a perspective interior-side view of a door system according to embodiments of the present invention, with the door system including a door frame, an interior panel attached to the door frame, and an exterior panel attached to the door frame.

FIG. 1 illustrates the door systems 16 in a closed position, while FIG. 2 illustrates one of the door systems 16 in an open position to thereby permit access to one of the storage compartments 18. As shown in FIGS. 2 and 3, the door system 16 broadly comprises a door frame 20 that includes a plurality of elongated frame members 22, an interior panel 24 coupled to the door frame 20 via a plurality of connectors 26 (See FIG. 3), and an exterior panel 28 coupled to the door frame 20. As such, the door system 16 is configured to transition from the closed position (i.e., FIG. 1) to the open position (i.e., FIG. 2) so as to provide access to the vehicle's 10 storage compartment 18. Further, the door system 16 is configured to transition from the open position to the closed position to sealingly isolate the storage compartment 18. While in the closed position, the door system 16 can remain secured to the body 12 of the vehicle 10 via a latch mechanism 30 (See FIGS. 1-2) to secure the door system 16 in the closed position.

Figure 4:
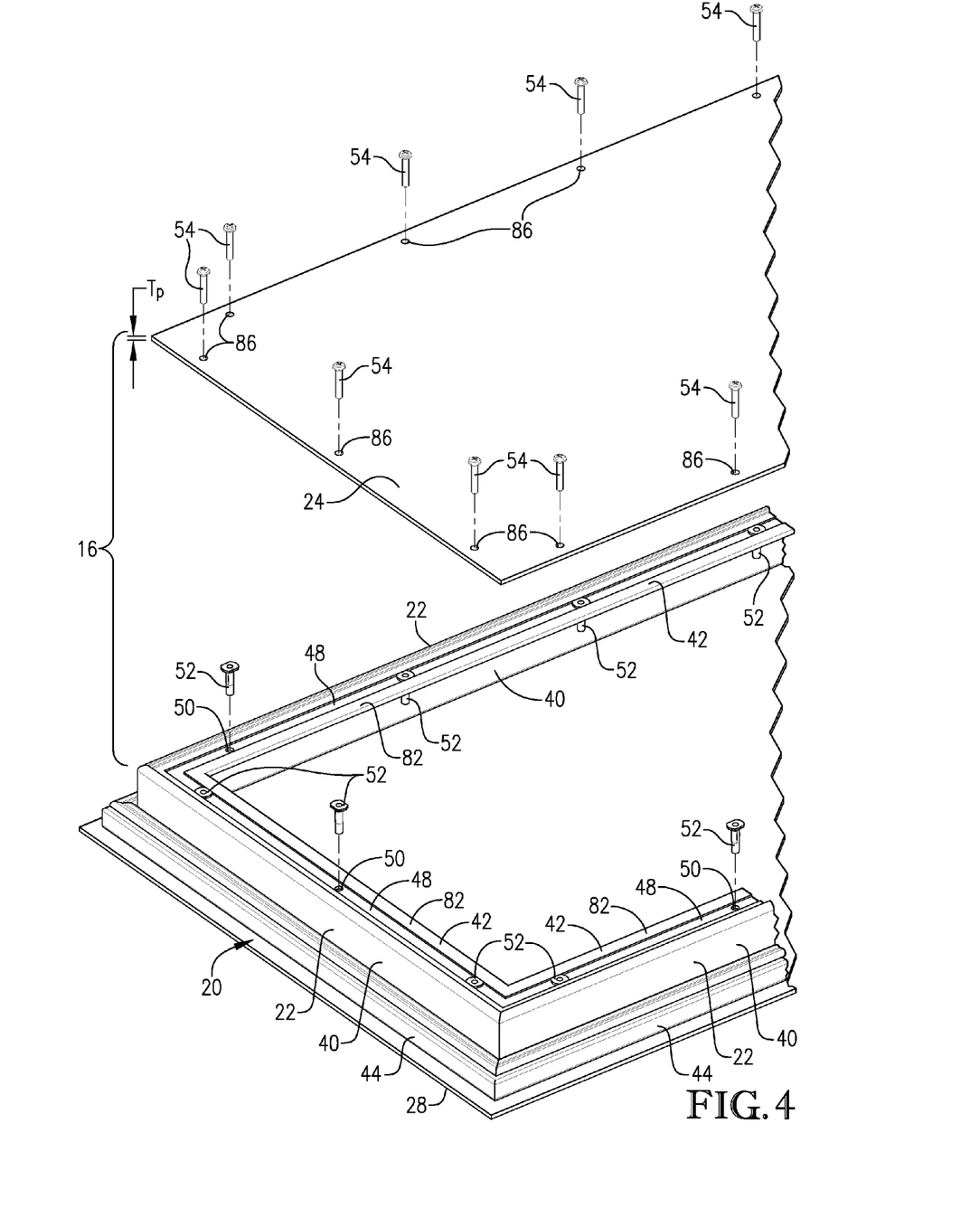
FIG. 4 is partial exploded view of the door system of FIG. 3.
Figure 5A:
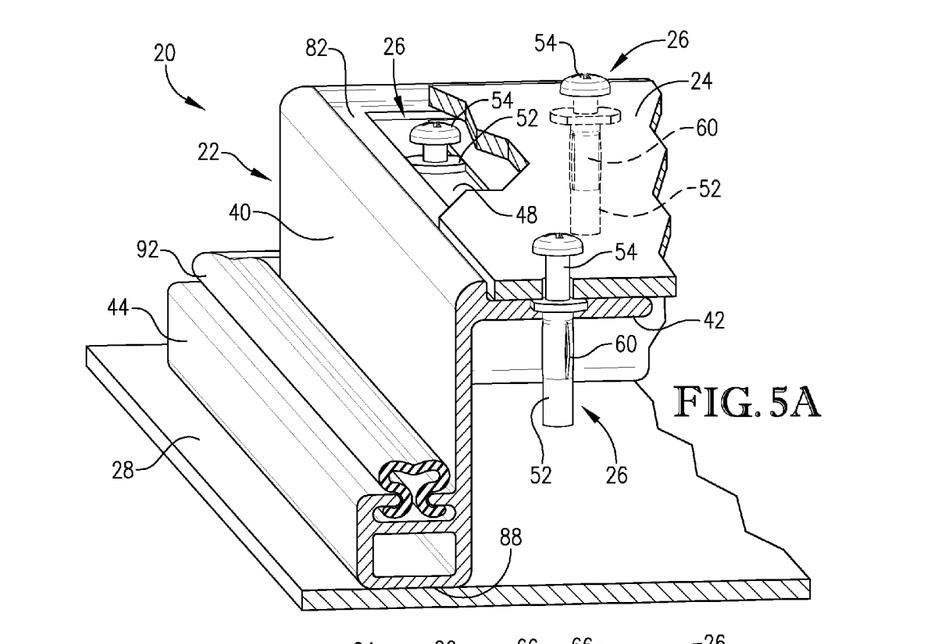
FIG. 5A is a partial cross section view of a door system according to embodiments of the present invention, particularly showing connectors of the door system in an initial, un-deformed configuration.
Figure 5B:
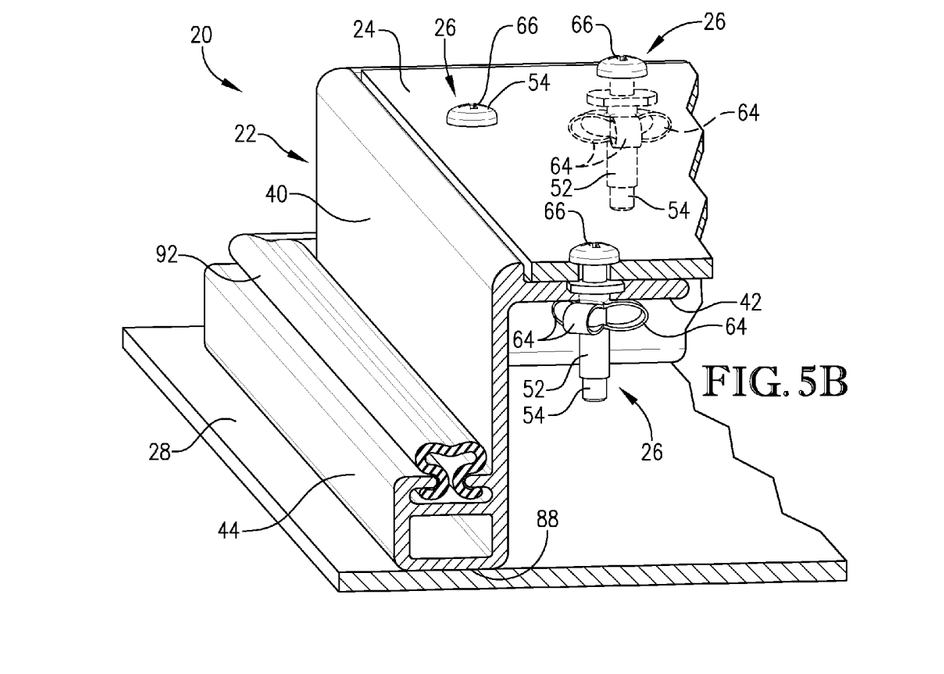
FIG. 5B is a partial cross-section view of the door system of FIG. 5, with the connectors in a final, deformed configuration.

FIGS. 4-5 illustrate portions of the door system 16 in detail. Broadly, the door frame 20 is configured in a generally rectangular configuration, with each of the frame members 22 rigidly coupled to one another via weld or the like. As such, the door frame will include a top, a bottom, and two side frame member 22, as illustrated in FIG. 3. In some embodiments, and with reference to FIGS. 4-5, each of the frame members 22 of the door frame 20 will comprise a main body member 40, an interior panel attachment flange 42, and an exterior panel attachment channel 44. The interior panel attachment flange 42 and the exterior panel attachment channel 44 will be coupled to opposite edges of the main body member 40. Specifically, as shown in FIG. 5, the interior panel attachment flange 42 and the exterior panel attachment channel 44 will extend laterally from the main body member 40 in generally opposite directions. The door frame members 22 may be formed from various metals, such as aluminum, steel, carbon fiber or the like. In certain preferred embodiments, the door frame members 22 may be extrudedly formed from aluminum.

Additionally, as perhaps best shown in FIG. 4, embodiments of the present invention provide for each of the frame members 22 of the door frame 20 to include a longitudinal groove 48 extending down a significant portion, or an entire length, of the interior panel attachment flange 42. As shown in the drawings, the longitudinal groove 48 may extend generally along an entire length of each frame member 22. In other embodiments, the longitudinal groove 48 may extend only along portions of the length of each frame member 22. Additionally, the frame members 22 will include a plurality of longitudinally spaced apart insert openings 50 extending entirely through a thickness of each of the attachment flanges 42. In certain embodiments the insert openings 50 will be positioned in alignment with the longitudinal groove 48, such that the insert openings 50 open into the longitudinal groove 48.

The interior panel 24 is configured to be coupled to the door frame 20 by securing the interior panel 24 to the interior panel attachment flanges 42 of the frame members 22. In more detail, and with reference to FIGS. 4-8, the connectors 26 of the door system 16 comprise a female threaded insert 52 (See FIGS. 7A-7D) and a male threaded fastener 54 (See FIGS. 8A-8b). As perhaps best shown by FIGS. 7A and 7B, each insert 52 comprises an insert head 56, an internally threaded sleeve 58, and a deformable section 60 positioned generally between the insert head 56 and the internally threaded sleeve 58. The deformable section 60 may include one or more longitudinal slits 62 that provide for the deformable section 60 to present one or more flared anchor members 64 when the insert 52 is deformed, as illustrated in FIGS. 7C and 7D. In more detail, the inserts 52 are configured to transition from an initial, un-deformed position, as shown in FIGS. 5A, 7A, and 7B, to a final, deformed position, as shown in FIGS. 5B, 7C, and 7D, as will be discussed in more detail below.

Figures 8A, 8B, 9:
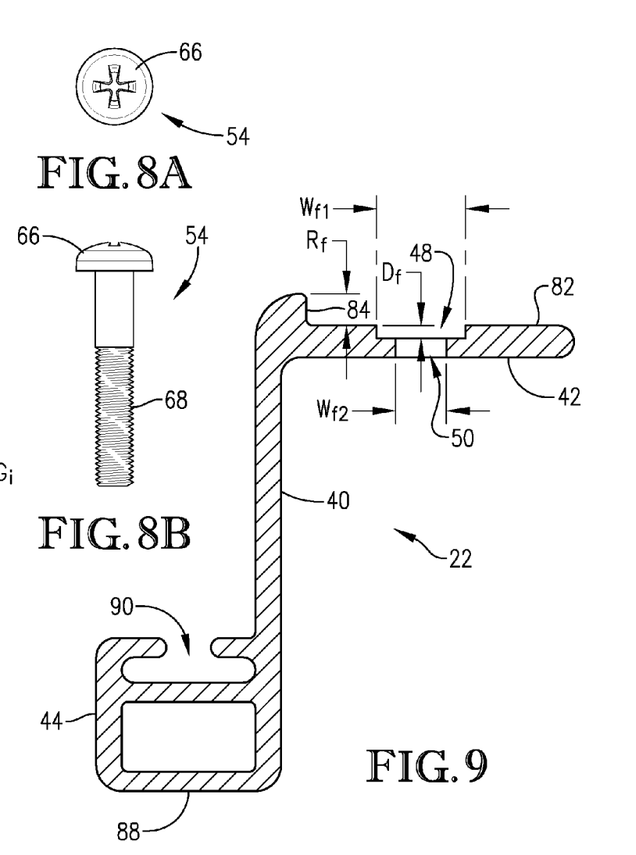
FIG. 8A is a top plan view of a fastener of a door system according to embodiments of the present invention.
FIG. 8B is a longitudinal cross-section of the fastener of FIG. 8A.
FIG. 9 is a cross-section of a frame member of a door system according to embodiments of the present invention.

Turning to the fasteners 54, as shown in FIGS. 8A-8B, the fasteners 54 may generally include a fastener head 66 and an externally threaded shaft 68. The threaded shaft 68 of the fastener 54 is configured to be received within the internally threaded sleeve 58 of the insert 52, as discussed below.

With the components described above, the interior panel 24 can be securely coupled to the door frame 20. In particular, each insert 52 of the connectors 26 can be received within one of the insert openings 50 of the frame members 22, as illustrated in FIGS. 4 and 5A, with the insert head 56 and the threaded sleeve 58 being positioned on opposite sides of the attachment flange 42. Because the insert openings 50 of the frame members 22 are located within the longitudinal grooves 48, the insert heads 56 of the inserts 52 will be received within the longitudinal grooves 48. In some embodiments, as illustrated by FIGS. 7A and 7C, the insert heads 56 will include a pair of substantially parallel flattened sides 80 that are spaced from one another by a distance Di that is substantially the same as a width Wf1 of the longitudinal groove 48 (See FIG. 9). As such, when the insert heads 56 are received within the longitudinal grooves 48, the flattened sides 80 will be orientated adjacently with sides of the longitudinal groove 48 so as to substantially prevent rotation of the insert 52 relative to the attachment flange 42. Additionally, embodiments provide for a thickness Ti of each insert head 56 (See FIGS. 7B and 7D) to be generally no greater than a depth Df of the longitudinal groove 48. Furthermore, a maximum width Wi of the insert head 56 is at least 1.1, 1.2, or 1.3 times a maximum width Wf2 of one of the insert openings 50 of the frame members 22. As such, with the inserts 52 received within the insert openings 50 of the frame members 22, a top surface of the insert head 56 will be generally flush with an engagement surface 82 of the frame members 22 (See FIGS. 4, 5A, and 5B), with such engagement surface 82 perhaps best illustrated by FIG. 9. Such flushness will allow for the interior panel 24 to be held flat against the engagement surface 82 of the attachment flange 42 with little or no gaps therebetween.

In more detail, the interior panel 24 can be secured to the door frame 20 by positioning the interior panel 24 adjacent with the attachment flange 42. The interior panel 24 can be flushly positioned against the engagement surface 82 of the frame members 22. As illustrated in FIG. 9, each frame member further presents an innermost edge 84. The engagement surface 82 is recessed relative to the innermost edge 84 by a recess distance Rf that is greater than, or substantially equal to a thickness Tp (See FIG. 4) of the interior panel 24. As such, with the interior panel 24 positioned against the engagement surface 82, a perimeter of the interior panel 24 is configured to be adjacent to the innermost edge 84, and a surface of the interior panel 24 is flush with an outermost portion of the innermost edge 84.

With the interior panel 24 positioned against the door frame 20 as provided above, the interior panel 24 can be coupled to the door frame 20 via the fasteners 54. In particular, the interior panel 24 will include a plurality of fastener openings 86 (See FIG. 4) that align with the insert openings 50 of the frame members 22 and the inserts 52 positioned within the insert openings 50. As such, the fasteners 54 can be inserted within the fastener openings 86 of the interior panel 24 and within the inserts 52 so as to secure the interior panel 24 against the attachment flange 42. In more detail, the inserts 52 are initially inserted within the insert openings 50 of the door frame 20 in the initial (un-deformed) configuration, as illustrated in FIGS. 5A, 7A, and 7B. Thereafter, one of the fasteners 54 can be received within each of the inserts 52 such that the exterior threads of the fasteners 54 engage with the interior threads of the inserts 52. As such, the fastener 54 can be actuated, i.e., rotated, so as to deform the insert 52 to the final (deformed) configuration, such as illustrated in FIGS. 5B, 6, 7C, and 7D. Such actuation can be performed by a variety of tools, such as hand-tools, electrical-tools, pneumatic-tools, or the like.

For example, the fastener 54 can be inserted within the insert 52 via a tool gun that, after insertion, rotates the fastener 54 so as to pull the internally threaded sleeve 58 of the insert 52 towards the insert head 56, thereby causing the deformable section 60 to deform into the flared anchor members 64 (See, e.g., the deformation of connectors 26 between FIGS. 5A and 5B). In some embodiments, each insert 52 will include at least two and/or not more than six flared anchor members 64, with the number of such flared anchor members 64 dependent on the number of longitudinal slits 62 included on the deformable section 60 of the insert 52.

Figure 6:
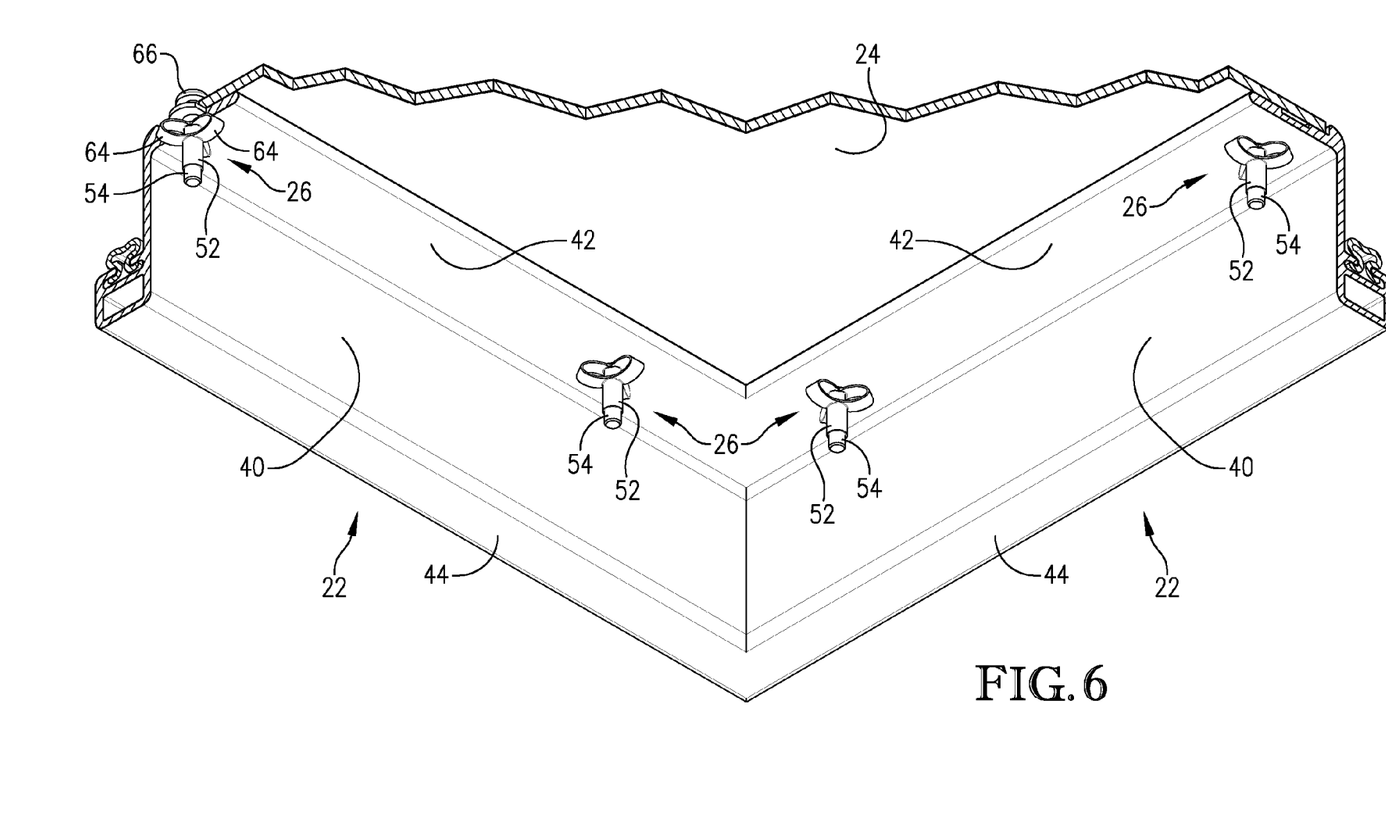
FIG. 6 is a partial exterior-side view of a door system according to embodiments of the present invention, with an exterior panel of the door system removed, and particularly showing connectors of the door system in a final, deformed configuration.
Figure 7A:
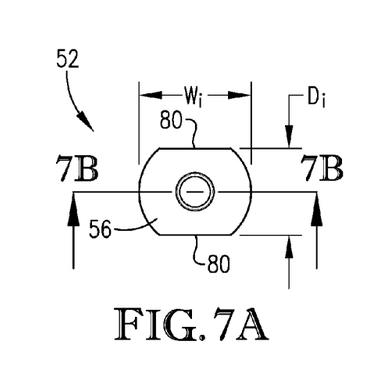
FIG. 7A is a top plan view of an insert of a door system according to embodiments of the present invention, with the insert in an initial, un-deformed configuration.
Figure 7B:
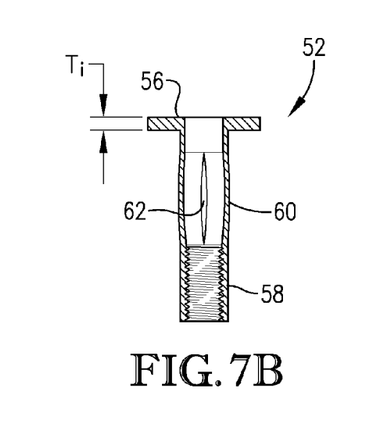
FIG. 7B is a longitudinal cross-section of the insert of FIG. 7A.
Figure 7C:
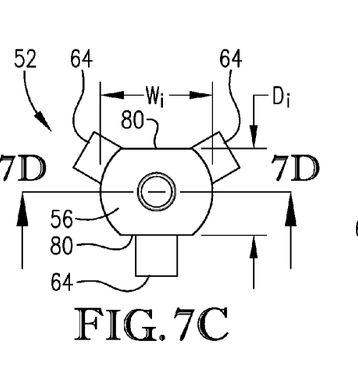
FIG. 7C is a top plan view of the insert of FIGS. 7A and 7B, with the insert in an final, deformed configuration.
Figure 7D:
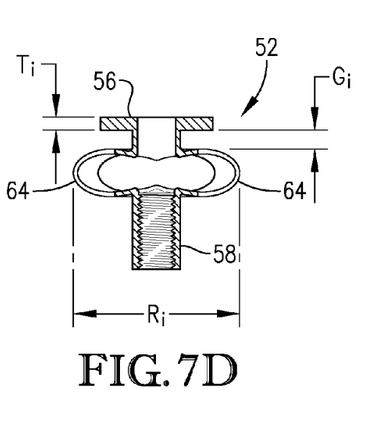
FIG. 7D is a longitudinal cross-section of the insert of FIG. 7C.

In the deformed configuration, the connectors 26 are configured to compress the attachment flange 42 and the interior panel 24 between the flared members 64 of the inserts 52 and the fastener heads 66 of the fasteners 54, as illustrated in FIGS. 5B and 6. In more detail, as shown in FIG. 7D, a holding gap Gi is formed between the insert head 56 and the flared anchor members 64. Thus, attachment flange 42 is capable of being received within the holding gap Gi and compressed between the insert heads 56 and the anchor members 64 of the inserts 52. Additionally, once the interior panel 24 has been secured to the attachment flange 42 via the connectors 26, the interior panel 24 and the attachment flange 42 will be compressed between the fastener heads 66 of the fasteners 54 and the attachment flange 42. With the combined use of the inserts 52 and the fasteners 54, the combination of the interior panel 24 and the attachment flange 42 will be compressed between the fastener heads 66 of the fasteners 54 and the flared anchor members 64 of the inserts 52.

As shown in FIG. 7D, the flared anchor members 64 extend radially outward from a central axis of the insert 52. In particular, the presented flared anchor members 64 may provide for the deformable section 60 to extend radially a distance Ri, which is at least 1.25, 1.5, or 2 times the width Wf2 of one of the insert openings 50 of the elongated frame members 22. Such radial extension of the anchor members 64 prevents longitudinal movement, e.g., pullout, of the insert 52 relative to the frame members 22, as shown in FIG. 6. Thus, the connectors 26 provide for securement of the interior panel 24 to the door frame 20.

In addition to the interior panel 24, the door frame 20 provides for the securement of the exterior panel 28, as is shown in the drawings. In particular, the exterior attachment channel 44 is configured to allow for the exterior panel 28 to be secured to an outer face 88 of the exterior attachment channel 44 (See FIG. 9). The exterior panel 28 may be secured via weld, fasteners, or other similar methods of attachment. In some embodiments, the external panel attachment channel 44 may include a seal slot 90 opposite the outer face 88. As shown in FIGS. 5A and 5B, the seal slot 90 may receive and retain a longitudinal sealing member 92 configured to form a seal with the body 12 of the vehicle 10 when the door system 16 is in the closed position.

Given the description provided above, the door system 16 is operable to provide a structurally supportive system for (1) providing access to the storage compartment 18 of the vehicle 10 when the door system 16 is in the open position, and (2) sealingly securing the storage compartment 18 when door system 16 is in the closed position. Embodiments of the present invention further include a method for forming the door system 16. For instance, such method may include an initial step of providing a door frame 20 comprised of a plurality of elongated frame members 22, with each frame member 22 having an attachment flange 42 with a longitudinal groove 48 and a series of longitudinally spaced apart insert openings 50, and with the insert openings 50 extending entirely through the attachment flange 42 and opening into the longitudinal groove 48. The method includes the next step of inserting a plurality of inserts 52 into the insert openings 50, with the inserts 52 comprising an insert head 56, an internally threaded sleeve 58, and a deformable portion 60. A next step of the method includes positioning an interior panel 24 flushly against the attachment flanges 42 of the frame members 22, and a final step includes securing the interior panel 24 to the door frame 20 by inserting fasteners 54 through the interior panel 24 and into the inserts 52. During the securing step, the inserts 52 are deformed so as to compress the interior panel 24 between the attachment flanges 42 and the heads 66 of the fasteners 54.

Although this invention has been described with its preferred embodiment(s), it is noted that equivalents may be employed and substitutions made herein without departing from the scope of the invention.

What is claimed is:

1. A door system for a service vehicle, said door system comprising:
   a door frame comprising a plurality of elongated frame members;
   an interior panel coupled to the door frame; and
   a plurality of connectors for coupling said interior panel to said door frame,
   wherein each of said frame members comprises an attachment flange having a longitudinal groove and a series of longitudinally spaced insert openings, wherein said insert openings extend entirely through said attachment flange and open into said longitudinal groove,
   wherein said connectors extend through said insert openings to secure said interior panel to said door frame.

2. The door system according to claim 1, wherein each connector comprises a female threaded insert and a male threaded fastener.

3. The system according to claim 2, wherein each insert comprises an insert head, an internally threaded sleeve, and one or more flared anchor members positioned generally between said insert head and said internally threaded sleeve, and wherein each insert is received in one of said insert openings such that said insert head and said internally threaded sleeve are positioned on generally opposite sides of said attachment flange.

4. The system according to claim 3, wherein each fastener comprises a fastener head and an externally threaded shaft, and wherein said externally threaded shaft is threadably received in said internally threaded sleeve of said insert and said fastener head holds said interior panel against said attachment flange.

5. The system according to claim 1, wherein said frame members are secured together in a substantially rectangular configuration.

6. The system according to claim 1, wherein said frame members each include a main body member, an exterior panel attachment channel, and said interior panel attachment flange, wherein said interior panel attachment flange and said exterior panel attachment channel extend laterally from opposite edges of said main body member in substantially opposite directions.

7. The system according to claim 6, wherein said door system further comprises an exterior panel attached to said exterior panel attachment channel.

8. The system according to claim 4, wherein each of said fastener heads includes a pair of substantially parallel flattened sides that are spaced from one another by a distance that corresponds with a width of said longitudinal groove, such that the fastener heads can be received within the longitudinal grooves and can be substantially prevented from rotating.

9. The system according to claim 4, wherein the flared anchor members of each insert are formed by deforming said insert while the insert is received in said insert opening.

10. The system according to claim 9, wherein said flared anchor members of one of the inserts provide for the insert to have a maximum width that is at least 1.25 times a width of the insert opening in which the insert is received.

11. A vehicle with a door system for accessing a compartment within said vehicle, said vehicle comprising:
   a drivers cab;
   a body located behind said cab, wherein said door system is incorporated into said body;
   said door system including—
   a door frame comprising a plurality of elongated frame members;
   an interior panel coupled to the door frame; and
   a plurality of connectors for coupling said interior panel to said door frame,
   wherein each of said frame members comprises an attachment flange having a longitudinal groove and a series of longitudinally spaced insert openings, wherein said insert openings extend entirely through said attachment flange and open into said longitudinal groove,
   wherein said connectors extend through said insert openings to secure said interior panel to said door frame.

12. The door system according to claim 11, wherein each connector comprises a female threaded insert and a male threaded fastener.

13. The system according to claim 12, wherein each insert comprises an insert head, an internally threaded sleeve, and one or more flared anchor members positioned generally between said insert head and said internally threaded sleeve, and wherein each insert is received in one of said insert openings such that said insert head and said internally threaded sleeve are positioned on generally opposite sides of said attachment flange.

14. The system according to claim 13, wherein each fastener comprises a fastener head and an externally threaded shaft, and wherein said externally threaded shaft is threadably received in said internally threaded sleeve and said fastener head holds said interior panel against said attachment flange.

15. The system according to claim 11, wherein said frame members are formed from extruded aluminum.

16. The system according to claim 13, wherein each insert includes one or more longitudinal slits configured to allow said inserts to deform while the insert is received in said insert opening.

17. The system according to claim 16, wherein said inserts are configured to deform such that said flared anchor members extend radially outward from a central axis of said insert.

18. A process for forming a door system for a service vehicle, said process comprising:
   (a) providing a door frame comprised of a plurality of elongated frame members, with each frame member having an attachment flange that includes a longitudinal groove and a series of longitudinally spaced apart insert openings, and with the insert openings extending entirely through the attachment flange and opening into the longitudinal groove;
   (b) inserting a plurality of inserts into the insert openings, with the inserts comprising an insert head, an internally threaded sleeve, and a deformable portion;
   (c) positioning an interior panel flushly against the attachment flanges of the frame members; and
   (d) securing the interior panel to the door frame by inserting fasteners through the interior panel and into the inserts, with the fasteners each including a fastener head an exteriorly threaded shaft,
   wherein during said securing of step (d), the inserts are deformed so as to compress the interior panel between the attachment flanges and the heads of the fasteners.

19. The process according to claim 18, further including the step of securing an exterior panel to the door frame, wherein the exterior panel functions as an exterior portion of a body of the vehicle.

20. The process according to claim 18, further including the step of coupling a longitudinal seal to the door frame, such that the door system is configured to seal a storage compartment of the vehicle when the door system is in a closed position.

* * * * *